United States Patent
Sasaki et al.

(10) Patent No.: US 8,171,607 B2
(45) Date of Patent: May 8, 2012

(54) METHOD OF MANUFACTURING CERAMIC CAPACITOR

(75) Inventors: Yoshitaka Sasaki, Santa Clara, CA (US); Atsushi Iijima, Hong Kong (CN); Hiroshi Ikejima, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 187 days.

(21) Appl. No.: 12/363,140

(22) Filed: Jan. 30, 2009

(65) Prior Publication Data

US 2010/0192343 A1    Aug. 5, 2010

(51) Int. Cl.
*H01G 7/00* (2006.01)
*H01G 4/005* (2006.01)
*H01G 4/06* (2006.01)

(52) U.S. Cl. ...... 29/25.41; 29/25.42; 361/303; 361/311; 361/321.1

(58) Field of Classification Search .................. 29/25.41, 29/25.42; 361/303, 311, 313, 321.1
See application file for complete search history.

(56) References Cited

U.S. PATENT DOCUMENTS

| | | | | |
|---|---|---|---|---|
| 5,956,224 | A * | 9/1999 | Jeon ............................. | 361/303 |
| 6,542,351 | B1 * | 4/2003 | Kwang ........................ | 361/303 |
| 6,559,004 | B1 * | 5/2003 | Yang et al. ................... | 438/253 |
| 2008/0293209 | A1 * | 11/2008 | Radall ........................ | 438/381 |
| 2009/0000093 | A1 * | 1/2009 | Sasaki et al. ................ | 29/25.42 |

FOREIGN PATENT DOCUMENTS

| | | |
|---|---|---|
| JP | A-11-97280 | 4/1999 |
| JP | A-2001-85271 | 3/2001 |
| JP | A-2007-161527 | 6/2007 |
| JP | A-2008-10530 | 1/2008 |

* cited by examiner

*Primary Examiner* — David Angwin
(74) *Attorney, Agent, or Firm* — Oliff & Berridge, PLC

(57) ABSTRACT

In a method of manufacturing ceramic capacitor according to the present invention, a pair of interdigitated internal electrodes are arranged perpendicularly to the surface of the substrate, subsequent to which the respective end faces of this pair of internal electrodes are exposed, and a pair of external electrodes are formed at these exposed end faces. In this method of manufacturing ceramic capacitor, formation of the external electrodes on the end faces of the respective internal electrodes, with these internal electrodes being interdigitately integrally-formed and the end faces thereof being exposed, it possible to reliably and easily form the external electrodes.

7 Claims, 23 Drawing Sheets

METHOD OF MANUFACTURING CERAMIC CAPACITOR

BACKGROUND OF THE INVENTION

1. Field of the Invention

The present invention relates to a method of manufacturing a ceramic capacitor that is formed on a substrate.

2. Related Background Art

In the past, a stacked ceramic capacitor has been known as one of ceramic capacitors. Such a stacked ceramic capacitor 1 has a structure as shown in FIG. 23, and is configured in accordance with a stacked member 6 in which some ceramic dielectric layers 2 and some internal electrode layers 4 are alternately stacked in a up-down direction, and a pair of electrodes 8A, 8B that are formed so as to sandwich this stacked member 6 laterally. Furthermore, regarding the internal electrode layers 4 of this capacitor 1, any two adjacent internal electrode layers 4 are connected to different electrodes 8A, 8B as shown FIG. 23B in detail.

As a method of manufacturing the stacked ceramic capacitor described above, a sheet method and a print method are known. Both of these manufacturing methods manufacture a stacked ceramic capacitor by the method comprises steps of, forming a stacked member in which layers consisting of a ceramic dielectric powder that configure dielectric layers and layers consisting of an electrode paste (a conductive paste) that configure internal electrode layers are alternately stacked in a plurality of layers, and providing external electrodes subsequent to baking this stacked member.

In forming these dielectric layers, a ceramic compact (a so-called green sheet), which is manufactured by mixing together a ceramic dielectric powder, an organic binder and an organic solvent to create a slurried dielectric paste, making this dielectric paste into a sheet shape using a doctor blade method or the like, and suitably drying the green sheet, is utilized. On the other hand, the electrode paste utilized in forming the internal electrode layers is made into a paste by dispersing nickel or another such metallic powder into an organic binder and an organic solvent.

Then, the stacked ceramic capacitor is manufactured normally by the method comprises steps of, screen printing the electrode paste onto the surface of the green sheet, drying off the organic solvent included in the electrode paste, overlapping the plurality of compacts and pressing that, chipping and baking the stacked member produced by the overlapped compacts. The plurality of internal electrode layers is exposed at the lateral face of the chipped stacked member, and the external electrode is formed on the lateral face of the stacked member so as to electrically connect these internal electrode layers.

According to the progress toward smaller, thinner, more lightweight electronic devices in recent years, the stacked ceramic capacitor mentioned above is needed to be further smaller, moreover, the ceramic dielectric layers and internal electrode layers of these capacitors are required to be as thin as possible (made low profile), and stacked as many of these layers as possible (multi-layered) from the standpoint of higher capacity.

SUMMARY OF THE INVENTION

However, the conventional ceramic capacitor described above suffers from the following problems. That is, in a case where the external electrodes are not reliably connected to the internal electrode layers, the unconnected internal electrode layers do not function as a capacitor, causing capacitance to drop across the entire device, and making the internal electrode layers thinner and multi-layered has made it difficult to reliably connect all of the internal electrode layers to the external electrodes.

An object of the present invention, which has been devised to resolve the above-mentioned problems, is to provide a method of manufacturing ceramic capacitor that makes it possible to reliably and easily form an external electrode.

A method of manufacturing ceramic capacitor related to the present invention comprises a step of forming a pair of first internal electrodes, which are arranged, on a substrate, perpendicularly to a surface of the substrate, and which interdigitate via a prescribed gap; a step of filling a first ceramic dielectric member into a gap between the pair of first internal electrodes; a step of exposing respective end faces of the pair of first internal electrodes; and a step of forming a pair of external electrodes at the exposed end faces of the first internal electrodes.

In this method of manufacturing ceramic capacitor, a pair of interdigitated internal electrodes are arranged perpendicularly to the surface of the substrate, subsequent to which the respective end faces of this pair of internal electrodes are exposed, and a pair of external electrodes are formed at these exposed end faces. In this method of manufacturing ceramic capacitor, forming the external electrodes at the end faces of the respective internal electrodes after these internal electrodes have been interdigitately integrally cast and the end faces thereof exposed like this makes it possible to reliably and easily form the external electrodes.

Further, the mode may be such as to further comprises a step of forming an insulation layer on the first internal electrodes, subsequent to the step of filling with the first ceramic dielectric member; a step of forming on the insulation layer a pair of second internal electrodes, which are arranged on the substrate perpendicularly to the surface of the substrate, and which interdigitate via a prescribed gap; and a step of filling a second ceramic dielectric member into the gap between the pair of second internal electrodes, and in the step of exposing respective end faces of the pair of first internal electrodes, the respective end faces of the pair of second internal electrodes are also exposed, and in the step of forming the pair of external electrodes, the pair of external electrodes are formed at the exposed end faces of the first internal electrodes and the second internal electrodes. An increase in capacitance is achieved in accordance with this.

Further, the mode may also be such that the step of forming the insulation layer, the step of forming the pair of second internal electrodes, and the step of filling with the second ceramic dielectric member are repeated a plurality of times to achieve multi-layering. The capacitance is increase even more in this case.

Further, the mode may also be such that, in the step of exposing the end faces of the internal electrodes, the end faces are exposed by cutting portions of the internal electrodes together with the substrate.

Further, the mode may also be such that in the step of filling with the ceramic dielectric member, subsequent to using spin-coating to fill with a ceramic dielectric slurry, the ceramic dielectric slurry is hardened to form the ceramic dielectric member. In addition, the mode may also be such that the ceramic dielectric slurry is a, $BaTiO_3$ SOG slurry produced in a sol-gel process.

Further, the mode may also be such that branch parts, which extend from one of the pair of internal electrodes toward the other one of the pair of internal electrodes to interdigitate, are formed on mutually opposing surfaces of the pair of internal electrodes. Since the areas of the opposing surfaces of the pair of internal electrodes are enlarged in accordance with this, increased capacitance is achieved. In addition to this, the orientation stability of the internal electrode is enhanced subsequent to removing the thick-film mask.

According to the present invention, a method of manufacturing ceramic capacitor that achieves enhanced mechanical strength is provided.

DESCRIPTION OF THE PREFERRED EMBODIMENTS

Figure 1:
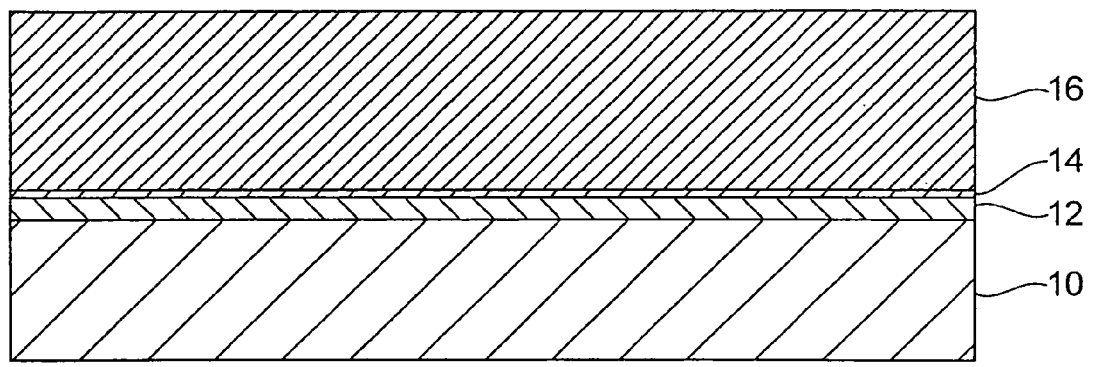
FIG. 1 is a diagram showing one process of the method of manufacturing ceramic capacitor related to a first embodiment.

The embodiments for working the present invention will be explained in detail while referring to the attached drawings. Furthermore, the same reference numerals will be assigned to identical or equivalent elements, and redundant explanations will be omitted.

First Embodiment

When manufacturing a ceramic capacitor related to the first embodiment of the present invention, first, as shown in FIG. 1, an $Al_2O_3$ insulation layer 12, Ni seed layer (first seed layer) 14, and thick-film photoresist masking layer 16 are sequentially stacked on top of a substrate 10 (for example, a silicon substrate). The seed layer 14 is 1000 Å thick, and the masking layer 16 is 6 μm thick.

Figure 2:
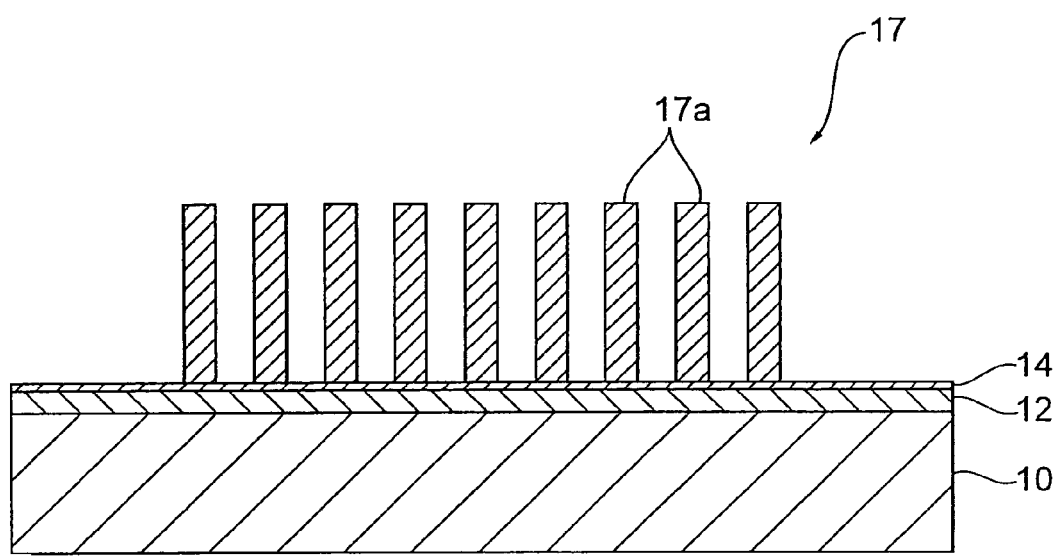
FIG. 2 is a diagram showing one process of the method of manufacturing ceramic capacitor related to the first embodiment.

Next, as shown in FIG. 2, patterning of the masking layer 16 is carried out using a known photoresist technique to form a thick-film mask (first thick-film mask) 17. The thick-film mask 17 comprises a plurality of mask strips 17a between 0.4 and 0.6 μm wide extending perpendicularly relative to the surface of the substrate 10, and, for example, this plurality of mask strips 17a is arranged regularly at clearances of between 0.6 and 0.8 μm.

Figure 3:
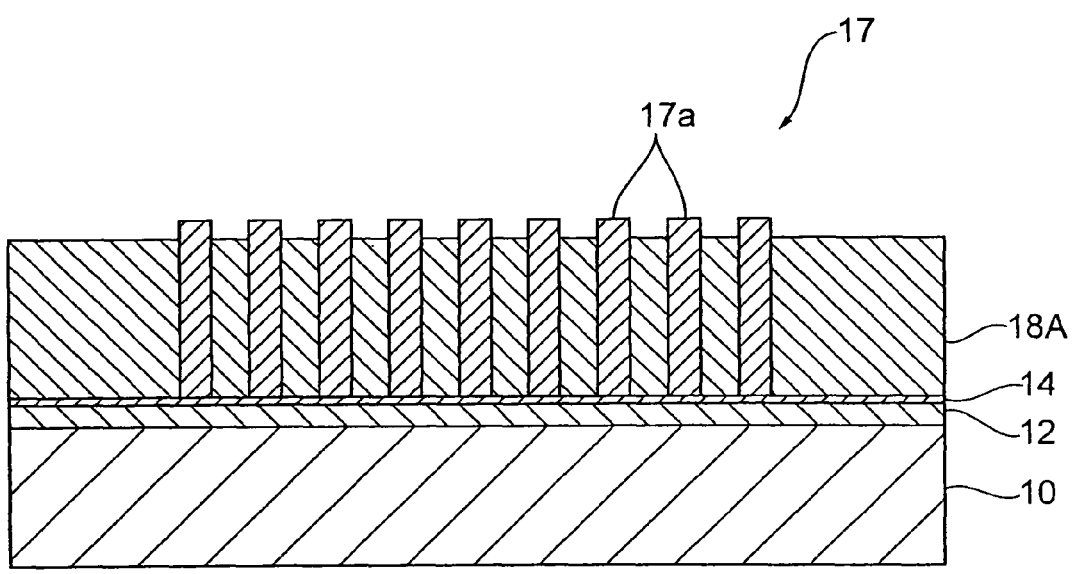
FIG. 3 is a diagram showing one process of the method of manufacturing ceramic capacitor related to the first embodiment.

Then, as shown in FIG. 3, Ni plating of the seed layer 14 is carried out to form a plated layer 18A. This plated layer 18A is formed 5.5 μm thick, and the top of the mask strip 17a is exposed above the surface of the plated layer 18A. The plated layer 18A is formed over the entire remaining area of the area in which the mask strips 17a have been formed, and the plated fills in the gap between adjacent mask strips 17a.

Figure 4:
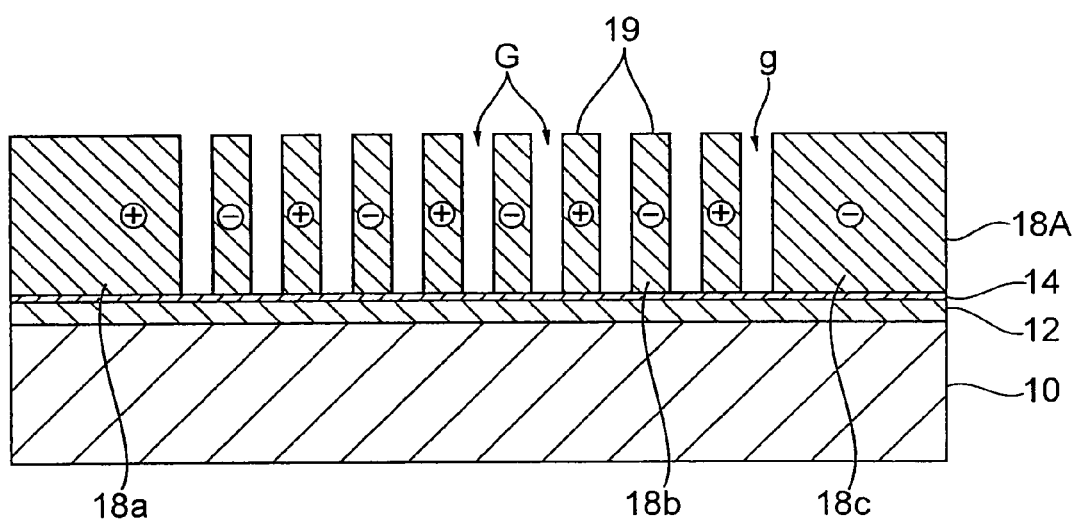
FIG. 4 is a diagram showing one process of the method of manufacturing ceramic capacitor related to the first embodiment.

Next, as shown in FIG. 4, the thick-film mask 17 is removed to produce internal electrodes 18a, 18b, 18c. These internal electrodes 18a, 18b, 18c comprise a plurality of electrode strips 19 formed in the gap between the adjacent mask strips 17a. Each electrode strip 19 is arranged in a standing condition so as to extend perpendicularly relative to the surface of the substrate 10 the same as the mask strips 17a.

The pattern of the internal electrodes 18a, 18b, 18c will be explained here while referring to FIG. 5.

Figure 5:
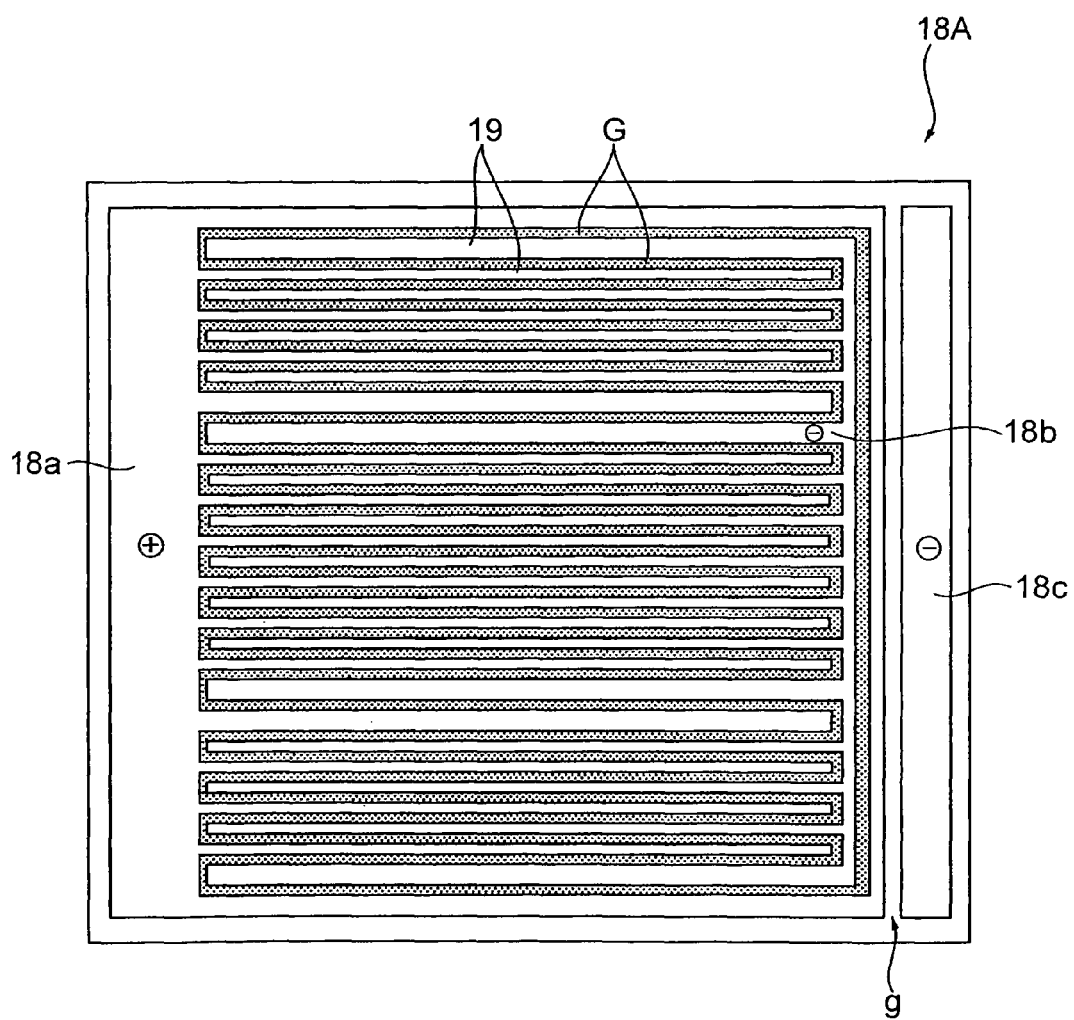
FIG. 5 is a plan view showing a pattern of an internal electrode of the ceramic capacitor related to the first embodiment.

As described hereinabove, the internal electrodes 18a, 18b, 18c are formed by patterning a plated layer 18A in accordance with the thick-film mask 17, and, consequently, the internal electrode constitutes, as shown in FIG. 5, opposing comb-like shapes that interdigitate with one another.

Specifically, the internal electrode 18b has a plurality of electrode strips 19 of uniform length parallelly lined up in the up-down direction in FIG. 5, and constitutes an interdigitated electrode pattern that is integrally connected at the respective end parts thereof (the right end part in FIG. 5). The internal electrode 18a also has a plurality of electrode strips 19 of uniform length parallelly lined up in the up-down direction in FIG. 5, and the electrode strips 19 of internal electrode 18a and the electrode strips 19 of internal electrode 18b are lined up in parallel via a groove-shaped gap G (for example, 0.5 μm wide) to be filled with a ceramic dielectric member that will be explained hereinbelow. The plurality of electrode strips 19 of internal electrode 18a constitutes an interdigitated electrode pattern that is integrally connected at the respective end parts thereof (the left end part in FIG. 5), and, in addition, are formed so as to surround internal electrode 18b. Consequently, the periphery of internal electrode 18b is completely surrounded by the above-mentioned gap, and this gap itself forms a closed circuit. Internal electrode 18c is arranged to the right side of internal electrode 18a via a vertically extending groove-shaped gap g, and extends in the up-down direction.

As for the above-described internal electrodes 18a, 18b, 18c, internal electrode 18a is differentiated from the interconnected internal electrodes 18b and 18c in a subsequent stage process. Overall, the internal electrodes 18a, 18b, 18c configure a pair of internal electrodes, the one side of which functions as an anode 18a, and the other side of which functions as a cathode 18b, 18c.

Furthermore, the widths of the respective electrode strips 19 of internal electrodes 18a, 18b do not necessarily have to be made uniform, and can intentionally be made non-uniform for the purpose of adjusting the current density flowing inside the electrode or other such characteristics. For example, an electrode strip 19 of a maximum width dimension of between 2.0 and 5.0 μm may coexist with an electrode strip 19 of a minimum width dimension of between 0.6 and 0.8 μm. Furthermore, Deep-UV exposure may be used to realize a depth of 5 μm, a width of between 0.6 and 0.8 μm, and plated layer spaces of between 0.4 and 0.6 μm.

Figure 6:
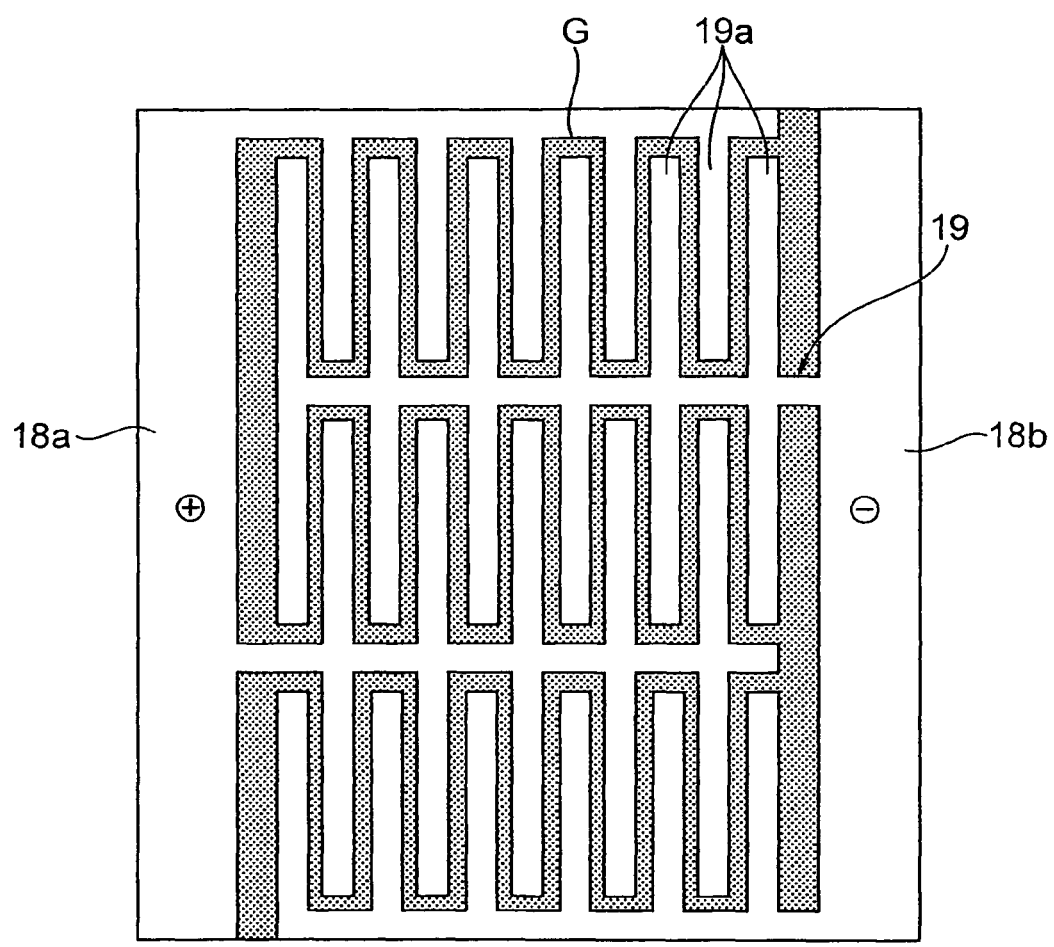
FIG. 6 is an enlarged view of the essential element of the internal electrode pattern of FIG. 5.

Microscopically speaking, the shape of the above-described electrode strip 19 is as shown in FIG. 6. That is, 5 μm-long branch parts 19a, which parallelly extend from the electrode strip 19 of the one side of the pair of internal electrodes 18a, 18b, 18c (for example, the anode 18a) to the electrode strip 19 of the other side (for example, the cathode 18b, 18c), are formed on mutually opposing surfaces of adjacent electrode strips 19. These branch parts 19a also interdigitate. Forming branch parts 19a like this increases the surface area of the electrode strips 19. In addition, when electrode strips 19 of relatively high heights are perpendicularly arranged in a standing condition as shown in FIG. 4, these electrode strips 19 are apt to detach, or collapse and peel off when the thick-film mask 17 is removed, but enhancing orientation stability by providing branch parts 19a to the electrode strips 19 makes it possible to effectively prevent the above situation.

Figure 7:
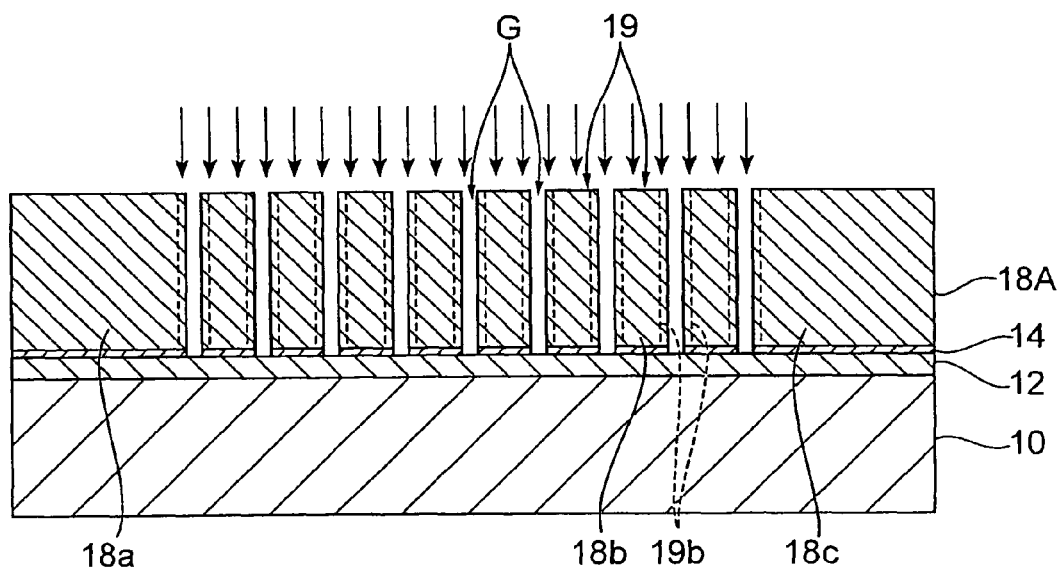
FIG. 7 is a diagram showing one process of the method of manufacturing ceramic capacitor related to the first embodiment.

Next, as shown in FIG. 7, a Ni ion beam is irradiated onto the plated layer 18A. This ion beam is irradiated perpendicularly (that is, at an angle inclination of 0 degrees) relative to the substrate surface, and the exposed portions of the seed layer 14 in the gaps G, g included between the internal electrodes 18a, 18b, 18c are removed via etching. This portion of the seed layer 14 is removed in accordance with this ion beam etching (IBE), and the internal electrodes 18a, 18b, 18c are electrically insulated from one another at this time. Furthermore, the Ni atoms of the seed layer 14 that are blown off (that is, sputtered) by this ion beam etching reattach to the sides of the electrode strips 19 surrounding this portion of the seed layer 14. In this way, for example, a 0.1 μm-thick reattached part 19b is formed on the electrode strips 19, and the width of the electrode strips 19 increases by the size of this reattached part 19b. In the meantime, since the sides of the electrode strips 19 on both sides of the gap G that is interposed between the electrode strips 19 draw closer to one another, the gap becomes narrower by the size of this reattached part 19b. For example, in a case where the width of the gap G (that is, the clearance between the electrode strips 19) is 0.5 μm, forming a 0.1 μm-thick reattached part 19b on the electrode strips 19 narrows the gap G by 0.2 μm, resulting in a gap G that is 0.3 μm wide.

Furthermore, the pointed top edges of the electrode strips 19 are rounded off by the above-mentioned ion beam etching, thereby also achieving an effect by which field convergence is alleviated when the capacitor is operating.

Next, a dielectric slurry is applied using a spin-coating process so as to cover the entire surface of the plated layer 18A. A $BaTiO_3$ SOG (Spin On Glass) slurry is used as this slurry. The $BaTiO_3$ SOG slurry, for example, is made by using any of a solid phase method, oxalic acid, hydrothermal, or sol-gel process to form a fine $BaTiO_3$ powder, and dissolving this powder in alcohol. By spin-coating this slurry, the dielectric slurry is filled into the narrow gap G between the electrode strips 19 of the internal electrodes 18a, 18b. Because the gap G between the internal electrodes 18a, 18b constitutes a closed circuit as described above, the dielectric slurry is accumulated inside the gap G, and leakage of the dielectric slurry outside of the gap is prevented. By contrast, since the gap g between internal electrode 18a and internal electrode 18c is not a closed circuit, the dielectric slurry does not accumulate inside this gap g.

The $BaTiO_3$ powder used in the SOG slurry of this embodiment was synthesized using the sol-gel process. This sol-gel process normally describes a liquid-phase synthesis method that uses an alkoxide hydrolysis reaction. This is advantageous in that, since the reaction is carried out inside the alcohol solution, the hydroxyl group is not likely to be captured inside the crystal, making it possible to obtain a high quality $BaTiO_3$ powder. The $BaTiO_3$ nano-powder actually synthesized was configured from high-crystalline particles of around 5 nm, and low-crystalline particles of around 3 nm.

Figure 8:
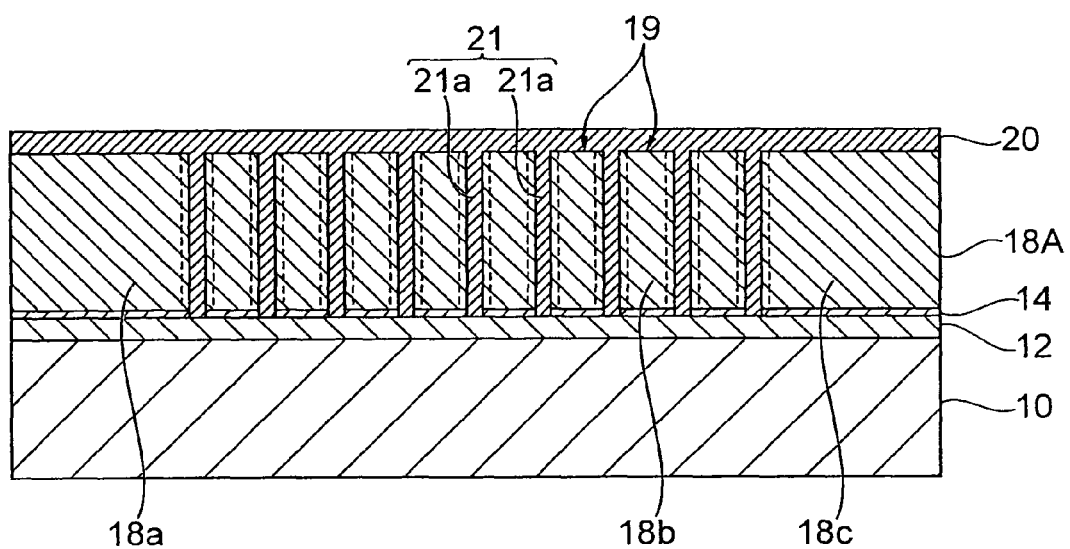
FIG. 8 is a diagram showing one process of the method of manufacturing ceramic capacitor related to the first embodiment.

Then, the above-described dielectric slurry is hardened via heat processing (annealing) at approximately 800° C. As a result of this, as shown in FIG. 8, a dielectric thin-film 20 having a thickness of 500 nm is formed on the surface of the plated layer 18A, and a ceramic dielectric member (a first ceramic dielectric member) 21 comprising dielectric strips 21a formed in the gap G between the electrode strips 19 is formed. That is, dielectric strips 21a of a ceramic dielectric member 21 are interposed between the adjacent electrode strips 19 of the pair of internal electrodes 18a, 18b, 18c, and the electrode strips 19 and dielectric strips 21a alternately overlap in the surface direction of the substrate 10. Furthermore, as described hereinabove, since the dielectric slurry does not exist in the gap g between internal electrode 18a and internal electrode 18c, the gap g remains empty as-is even after the heat treatment.

Furthermore, even in a case where, for example, a small amount of bubbles is generated and the dielectric slurry does not completely fill up the gap G between the electrode strips 19, the insulation of the electrode strips 19 is realized by the air inside the bubbles. For this reason, even when insufficient filling of the dielectric slurry occurs, this has substantially no impact on the characteristics of the ceramic capacitor 1A that is manufactured.

Thereafter, the dielectric thin-film 20 formed on the surface of the plated layer 18A is removed. Furthermore, this process may be omitted, and processing may proceed to the subsequent stage process leaving the dielectric thin-film 20 as-is.

Figure 9:
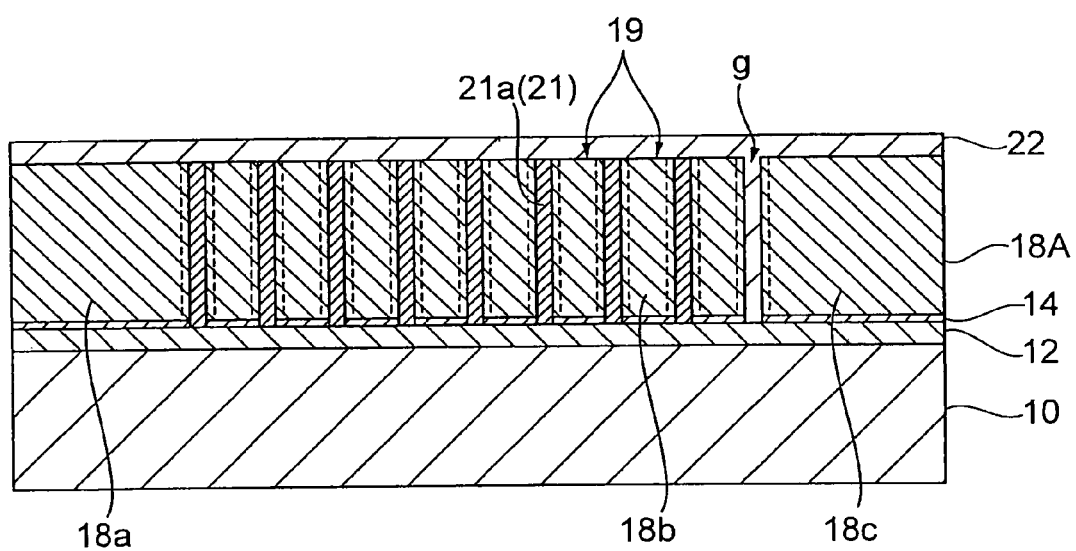
FIG. 9 is a diagram showing one process of the method of manufacturing ceramic capacitor related to the first embodiment.
Figure 10:
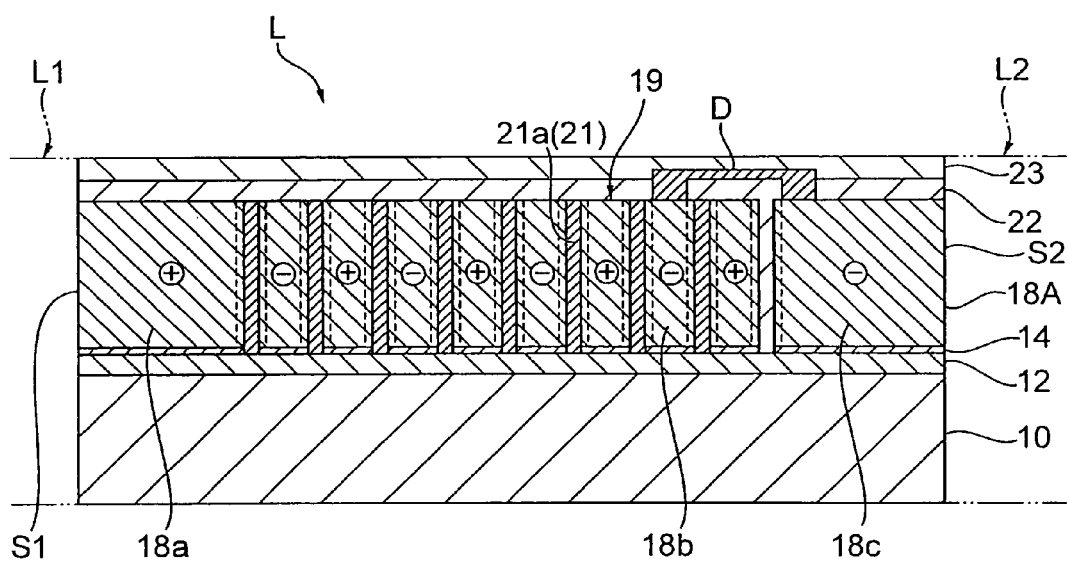
FIG. 10 is a diagram showing one process of the method of manufacturing ceramic capacitor related to the first embodiment.

Next, as shown in FIG. 9, an $Al_2O_3$ insulation layer 22 having a thickness of between 0.2 and 0.5 μm is formed on the plated layer 18A comprising the internal electrodes 18a, 18b, 18c. The $Al_2O_3$ is filled into the gap g between internal electrode 18a and internal electrode 18c at this time. Furthermore, subsequent to forming a prescribed through hole in the insulation layer 22, a conductor D like that shown in FIG. 10 is formed, and internal electrode 18b and internal electrode 18c, which function as the cathode, are connected by way of this conductor D. Furthermore, subsequent to forming the conductor D, an $Al_2O_3$ insulation layer 23, which integrally covers insulation layer 22 and conductor D, is formed.

In actuality, a plurality of stacked members having the same structure as the structure of the stacked member L produced through the processes explained above is parallelly formed on a single substrate. For this reason, at the time when the insulation layer 23 is formed, the stacked member L is linked on both sides to similarly structured stacked members L1, L2 on top of a single substrate 10.

Accordingly, cutting both ends of stacked member L together with the substrate 10 exposes the end faces of the internal electrodes 18a, 18b, 18c at the respective end faces (cutting faces) S1, S2 on opposite sides of stacked member L. That is, the end face of internal electrode 18a is exposed at the one end face S1 of the stacked member L, and the end face of internal electrode 18c is exposed at the other end face S2 of the stacked member L.

Figure 11:
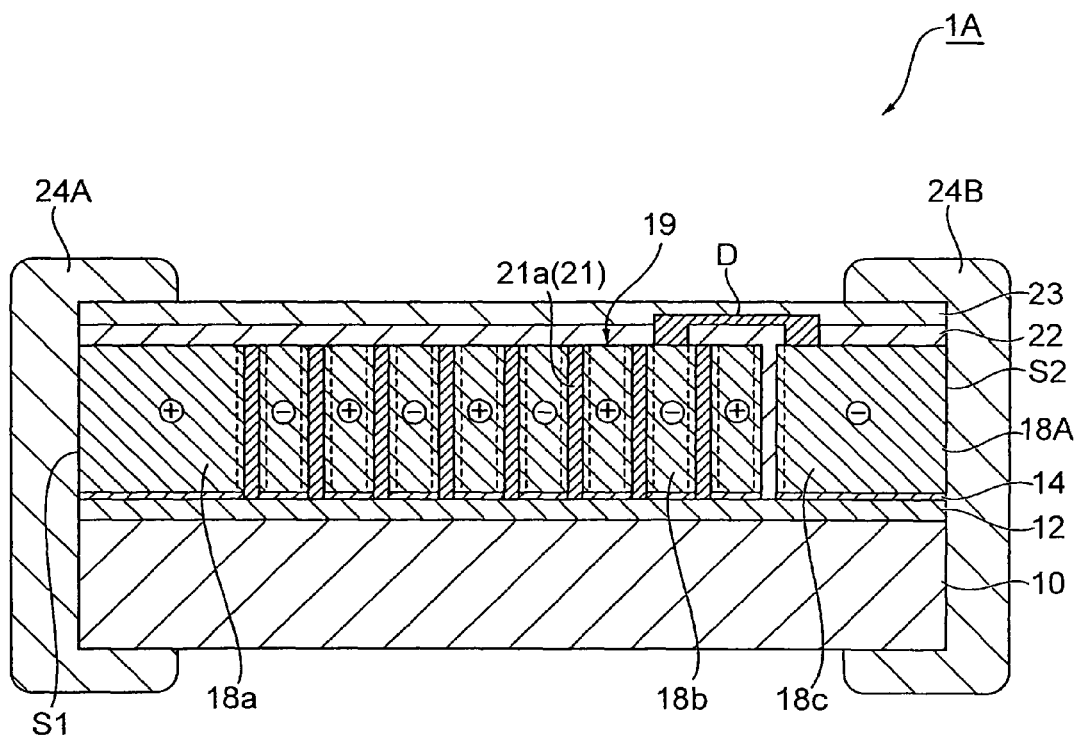
FIG. 11 is a simplified block diagram of the ceramic capacitor related to the first embodiment.

Finally, as shown in FIG. 11, a pair of external electrodes 24A, 24B are formed so as to connect to the pair of internal electrodes 18a, 18b, 18c, completing the manufacture of the ceramic capacitor 1A related to the first embodiment. Of the pair of external electrodes 24A, 24B, external electrode 24A, which functions as the anode, is formed by plating the end face S1 of the stacked member L, and is electrically connected to the anode 18a. Conversely, external electrode 24B, which functions as the cathode, is formed by plating the end face S2 of the stacked member L, is electrically connected to internal electrode 18c, and achieves conduction with cathode 18b, 18c.

A ceramic capacitor 1A manufactured in accordance with the above manufacturing method will be explained below.

Figure 23:
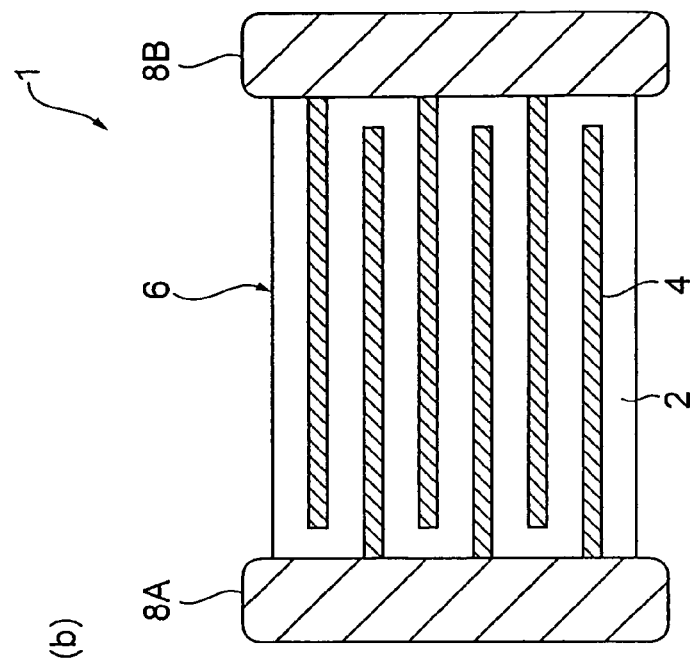
FIG. 23 is a diagram showing a ceramic capacitor related to the prior art.
Figure 23:
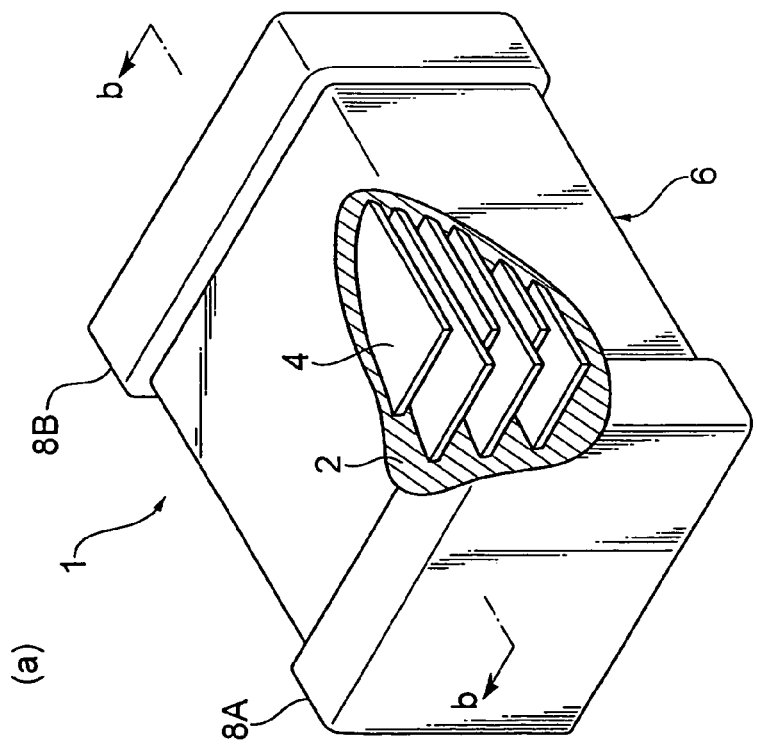

The ceramic capacitor 1A, as described hereinabove, comprises an interdigitated pair of internal electrodes 18a, 18b, 18c perpendicularly arranged in a standing condition relative to the surface of substrate 10, and a ceramic dielectric member 21 is filled into the gap G between this pair of internal electrodes 18a, 18b, 18c. For this reason, the internal electrodes 18a, 18b, 18c and the ceramic dielectric member 21 extend orthogonally relative to the surface of the substrate 10, and the electrode strips 19 of the internal electrodes 18a, 18b, 18c are parallelly lined up in a parallel direction relative to this substrate surface. Therefore, in this ceramic capacitor 1A, enhanced mechanical strength relative to the stress in the thickness direction thereof is realized. By contrast, the stacked ceramic capacitor 1 of FIG. 23, which is related to the prior art, incurs damage such as cracking and breaking when stress is applied in the thickness direction thereof due to the thinning of the ceramic dielectric member 2 and the internal electrode layer 4. That is, because the mechanical strength of ceramic capacitor 1A in the thickness direction is enhanced compared to that of the prior art, damage like this is significantly reduced.

Further, in the ceramic capacitor 1A, the electrode strips 19 of the internal electrodes 18a, 18b, 18c and the dielectric strips 21a of the ceramic dielectric member 21 are perpendicularly arranged in a standing condition relative to the surface of the substrate 10, such that a plurality of electrode strips 19 and a plurality of dielectric strips 21a are alternately arranged in the parallel direction relative to the substrate surface. That is, the electrode strips 19 and the dielectric strips 21a are arranged in multiple layers in the parallel direction relative to the substrate surface. For this reason, the multi-layering of the ceramic capacitor is readily realized in accordance with known patterning techniques. By contrast, in order for the stacked ceramic capacitor 1 of FIG. 23 related to the prior art to realize multi-layering, green sheets onto which an electrode paste has been applied must be repeatedly stacked on top of one another many times, requiring lots of work and time. That is, the multi-layering of the ceramic capacitor 1A may be performed more easily than in the prior art.

Furthermore, when manufacturing the ceramic capacitor 1A, a pair of internal electrodes 18a, 18b, 18c are formed in accordance with plating the top of the substrate 10, and a ceramic dielectric member 21 is filled into the gap G between this pair of internal electrodes 18a, 18b, 18c. In other words, a process for pressure forming a green sheet stacked member and a process for baking this stacked member, which were required in the prior art, are not included in this manufacturing process. For this reason, big changes in the width dimensions of the ceramic dielectric member 21 are less likely to occur in this manufacturing process, and the thickness dimensions thereof are precisely controlled. Further, the internal electrodes 18a, 18b, 18c are able to be formed with a high degree of precision, and the dimensions thereof are maintained until the manufacturing process ends. In other words, manufacturing the ceramic capacitor 1A in accordance with the above-described manufacturing method makes it possible to easily control the dimensions of the ceramic dielectric member 21 and the internal electrodes 18a, 18b, 18c, thereby also making it possible to easily perform dimensional control for the gap G between the internal electrodes 18a, 18b, 18c. As a result of this, uniformity of device characteristics, such as capacitance, is achieved.

In addition, the internal electrodes 18a, 18b, 18c of the ceramic capacitor 1A are arranged perpendicularly in a standing condition relative to the surface of the substrate 10, and a plurality of electrode strips 19 is each interdigitately cast. Then, after arranging these internal electrodes 18a, 18b, 18c in a standing condition, the end faces of the respective internal electrodes 18a, 18c thereof are exposed, and a pair of external electrodes 24A, 24B are formed on the exposed end faces. Forming the external electrodes 24A, 24B on the end faces of the internal electrodes 18a, 18c subsequent to exposing these end faces like this makes it possible to reliably and easily form the external electrodes 24A, 24B. In the stacked ceramic capacitor 1 of FIG. 23 related to the prior art, in a case where the external electrodes 8A, 8B are not reliably connected to the plurality of internal electrode layers 4, the unconnected internal electrode layers 4 do not function as a capacitor, thereby causing a drop in capacitance across the entire device. Making the internal electrode layers 4 thinner and multi-layered has made it difficult to reliably connect all of the internal electrode layers 4 to the external electrodes 8A, 8B. That is, manufacturing the ceramic capacitor 1A in accordance with the above-described manufacturing method makes it possible to reliably and easily form the external electrodes 24A, 24B.

Figure 12:
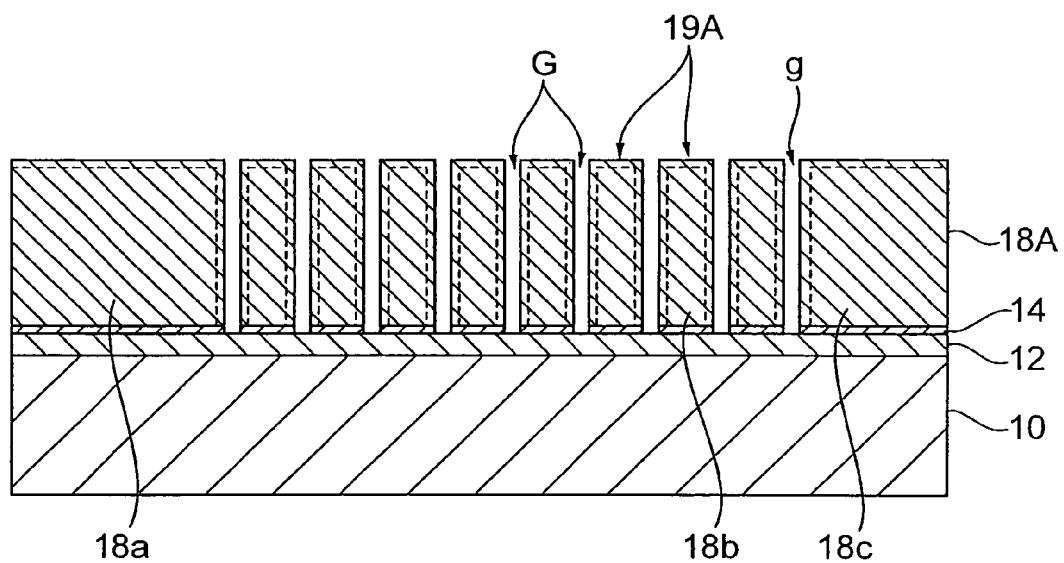
FIG. 12 is a diagram showing a different mode of the method of manufacturing ceramic capacitor.

Furthermore, among the above-described manufacturing processes, the following method may be used at the time of the process for increasing the width of the electrode strips 19 of the internal electrodes 18a, 18b. That is, as shown in FIG. 12, a Ni re-plating process is carried out subsequent to insulating the respective internal electrodes 18a, 18b, 18c of the plated layer 18A in accordance with ion bean etching. Consequently, a re-plated layer of a prescribed thickness (for example, 0.1 μm) is formed on the sides of the gaps G, g between the internal electrodes 18a, 18b, 18c, and on the surfaces of the internal electrodes 18a, 18b, 18c. This forms electrode strips 19A, the widths of which have been widened by a re-plated layer having been formed on the upper end faces and sides of the internal electrodes 18a, 18b, 18c. The thickness of this re-plated layer may be freely adjusted by adjusting plating time.

Second Embodiment

Figure 13:
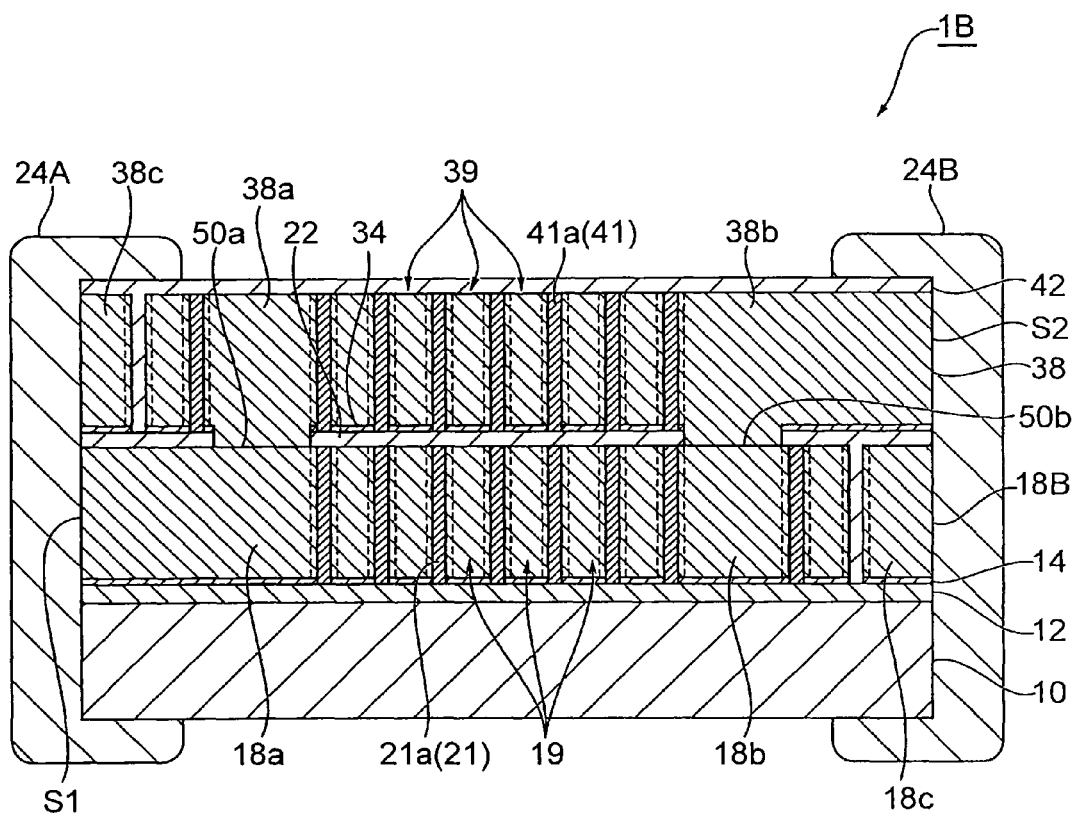
FIG. 13 is a simplified block diagram of the ceramic capacitor related to a second embodiment.
Figure 14:
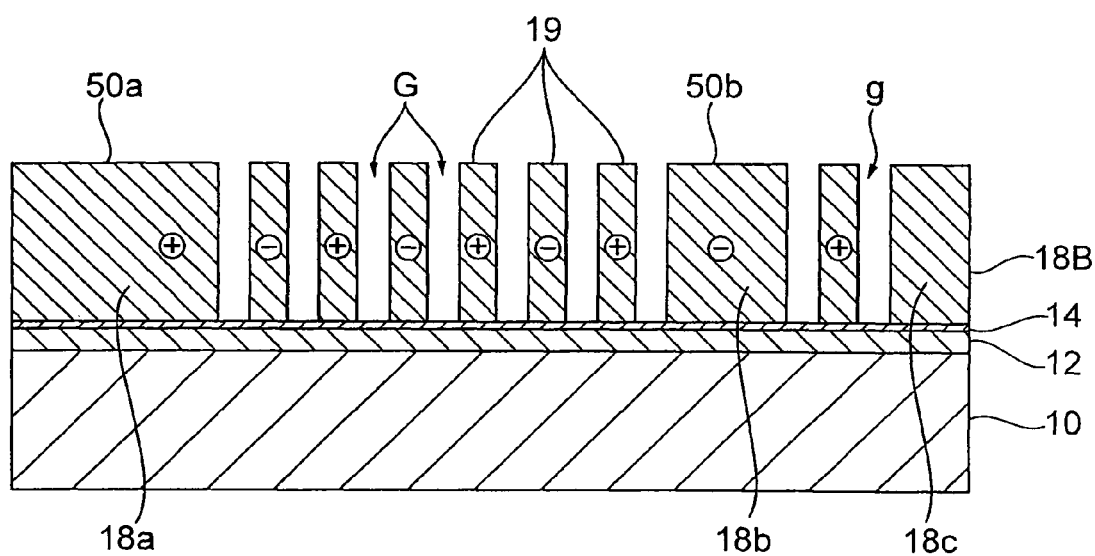
FIG. 14 is a diagram showing one process of the method of manufacturing ceramic capacitor related to the second embodiment.

Next, a ceramic capacitor 1B related to a second embodiment of the present invention will be explained. This ceramic capacitor 1B, as shown in FIG. 13, constitutes a two-tiered ceramic capacitor comprising internal electrodes 18a, 18b, 18c in the first tier, and internal electrodes 38a, 38b, 38c in the second tier.

The steps for manufacturing the ceramic capacitor 1B will be explained below.

When manufacturing ceramic capacitor 1B, first, patterned internal electrodes 18a, 18b, 18c are formed on top of a substrate 10 in accordance with the same steps as those in the first embodiment. That is, subsequent to sequentially layering a $Al_2O_3$ insulation layer 12, a Ni seed layer (first seed layer) 14, and a thick-film photoresist masking layer 16 on top of the substrate 10, masking layer 16 patterning is carried out using a known photoresist technique to form a thick-film mask 17. Then, subsequent to carrying out the Ni plating of the seed layer 14 to form a plated layer 18B, the thick-film mask 17 is removed to produce internal electrodes 18a, 18b, 18c of a prescribed pattern.

Figure 15:
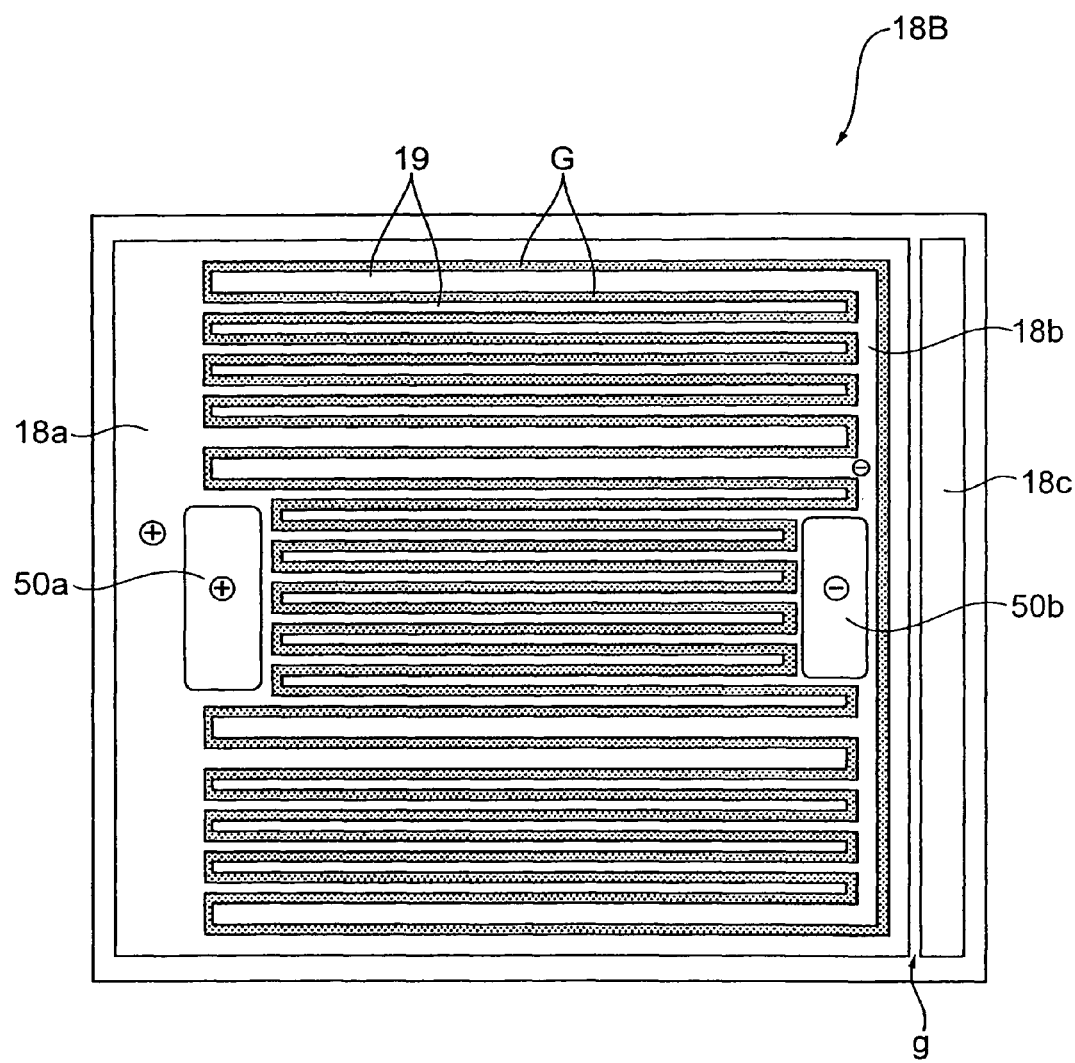
FIG. 15 is a plan view showing a first internal electrode pattern of a ceramic capacitor related to the second embodiment.

The pattern of the internal electrodes 18a, 18b, 18c in the second embodiment is as shown in FIG. 15. In other words, the pattern of the second embodiment differs from the pattern of the first embodiment in that a pair of connection areas 50a, 50b have been formed. The pair of connection areas 50a, 50b are arranged by being separated to the left and right of the plated layer 18B so as to sandwich the interdigitated pattern, and the one of the connection areas 50a is disposed in internal electrode 18a, and the other of the connection areas 50b is disposed in internal electrode 18b.

Figure 16:
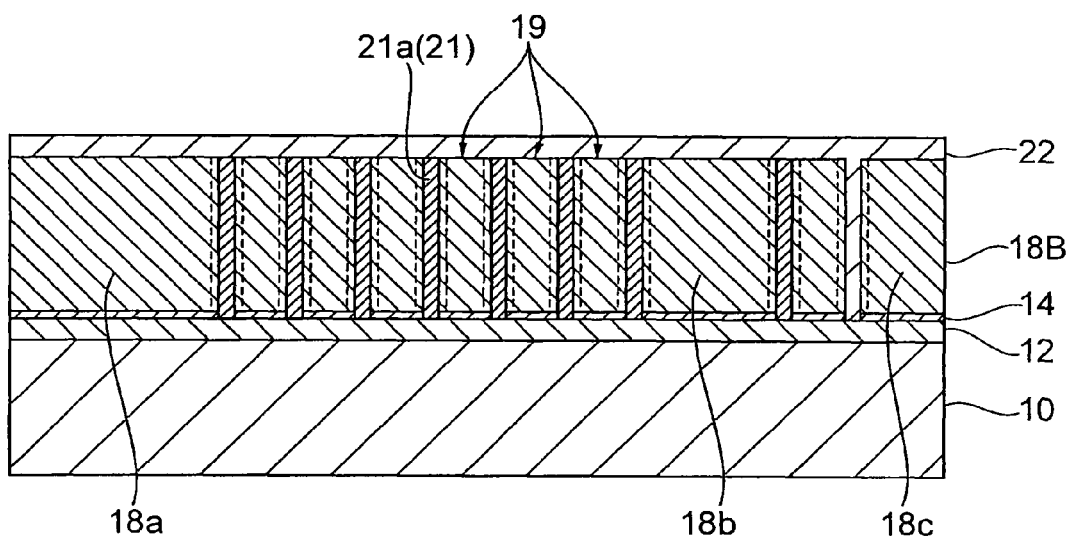
FIG. 16 is a diagram showing one process of the method of manufacturing ceramic capacitor related to the second embodiment.

Next, as shown in FIG. 16, ion beam etching, the application of the dielectric slurry, a thermosetting annealing treatment and the formation of an insulation layer 22 are carried out in accordance with the same steps as in the first embodiment. Furthermore, since the thermosetting annealing treatment for the dielectric slurry is carried out in a subsequent process in this embodiment, the thermosetting annealing treatment may be omitted at this time.

Figure 17:
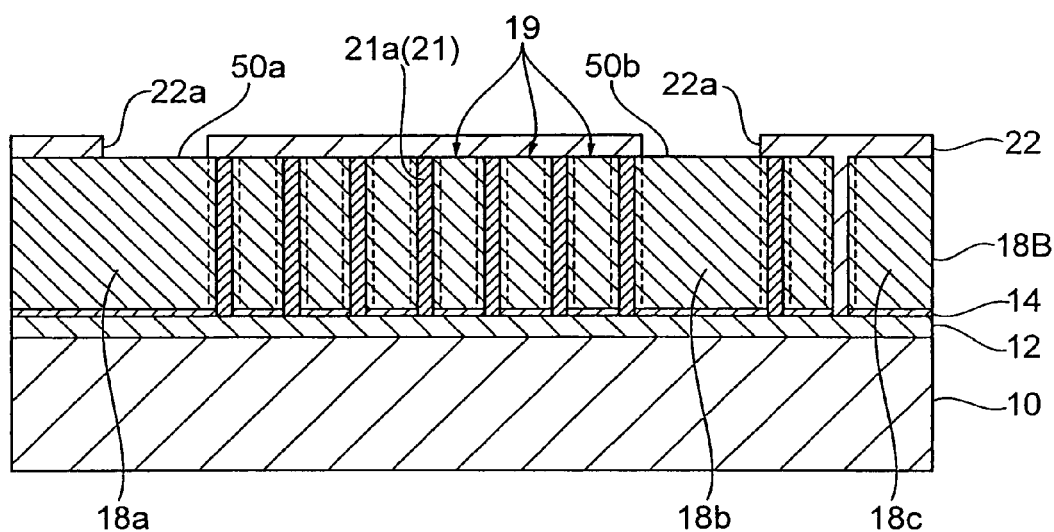
FIG. 17 is a diagram showing one process of the method of manufacturing ceramic capacitor related to the second embodiment.
Figure 18:
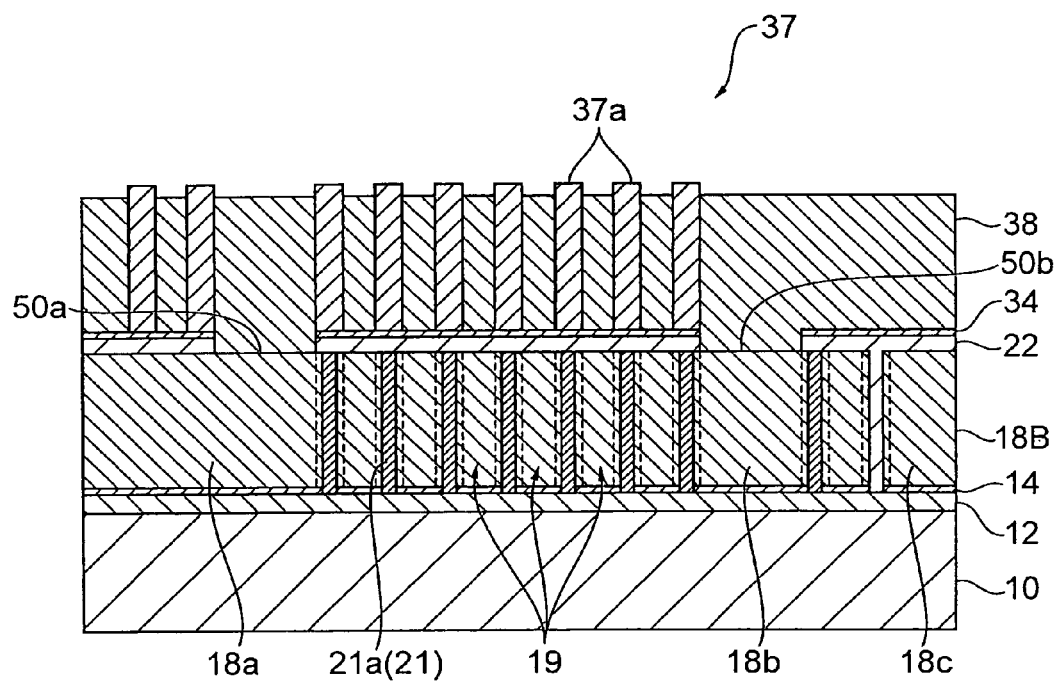
FIG. 18 is a diagram showing one process of the method of manufacturing ceramic capacitor related to the second embodiment.

Thereafter, as shown in FIG. 17, through holes 22a are formed in the insulation layer 22 in the areas corresponding to connection areas 50a, 50b on the upper surface of the plated layer 18B. Next, as shown in FIG. 18, a Ni seed layer (second seed layer) 34 is formed on top of the insulation layer 22, and a thick-film mask (second thick-film mask) 37 is formed and patterned using a thick-film photoresist masking layer (not shown in the drawing) on top of this seed layer 34. This thick-film mask 37 comprises a plurality of mask strips 37a extending perpendicularly to the substrate surface the same as the thick-film mask 17.

Then, the Ni plating of the seed layer 34 is carried out to form a plated layer 38. This plated layer 38 is formed such that the tops of the mask strips 37a are exposed at the surface of the plated layer 38 the same as plated layer 18A. The plated layer 38 is formed over the entire remaining area of the area in which the mask strips 37a have been formed, and the plating fills in the gap between adjacent mask strips 37a.

Figure 19:
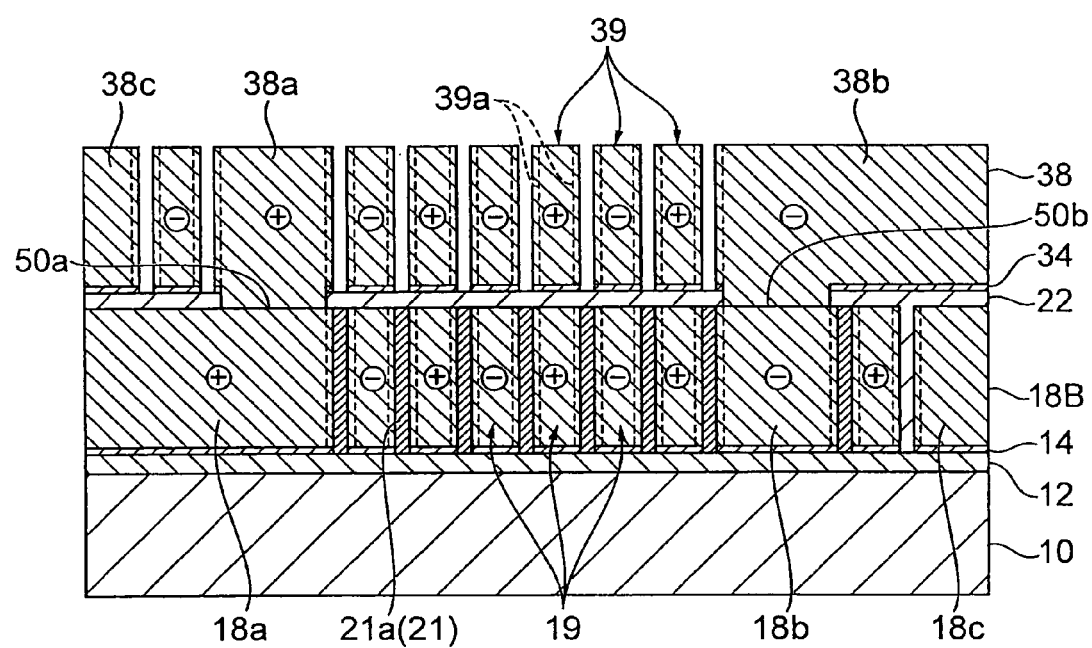
FIG. 19 is a diagram showing one process of the method of manufacturing ceramic capacitor related to the second embodiment.

Then, as shown in FIG. 19, the thick-film mask 17 is removed to produce internal electrodes 38a, 38b, 38c. These internal electrodes 38a, 38b, 38c comprise a plurality of electrode strips 39 formed in the gap between the adjacent mask strips 37a. Each electrode strip 39 is arranged in a standing condition so as to extend perpendicularly relative to the surface of the substrate 10 the same as the mask strips 37a.

The pattern of the internal electrodes 38a, 38b, 38c will be explained here while referring to FIG. 20.

Figure 20:
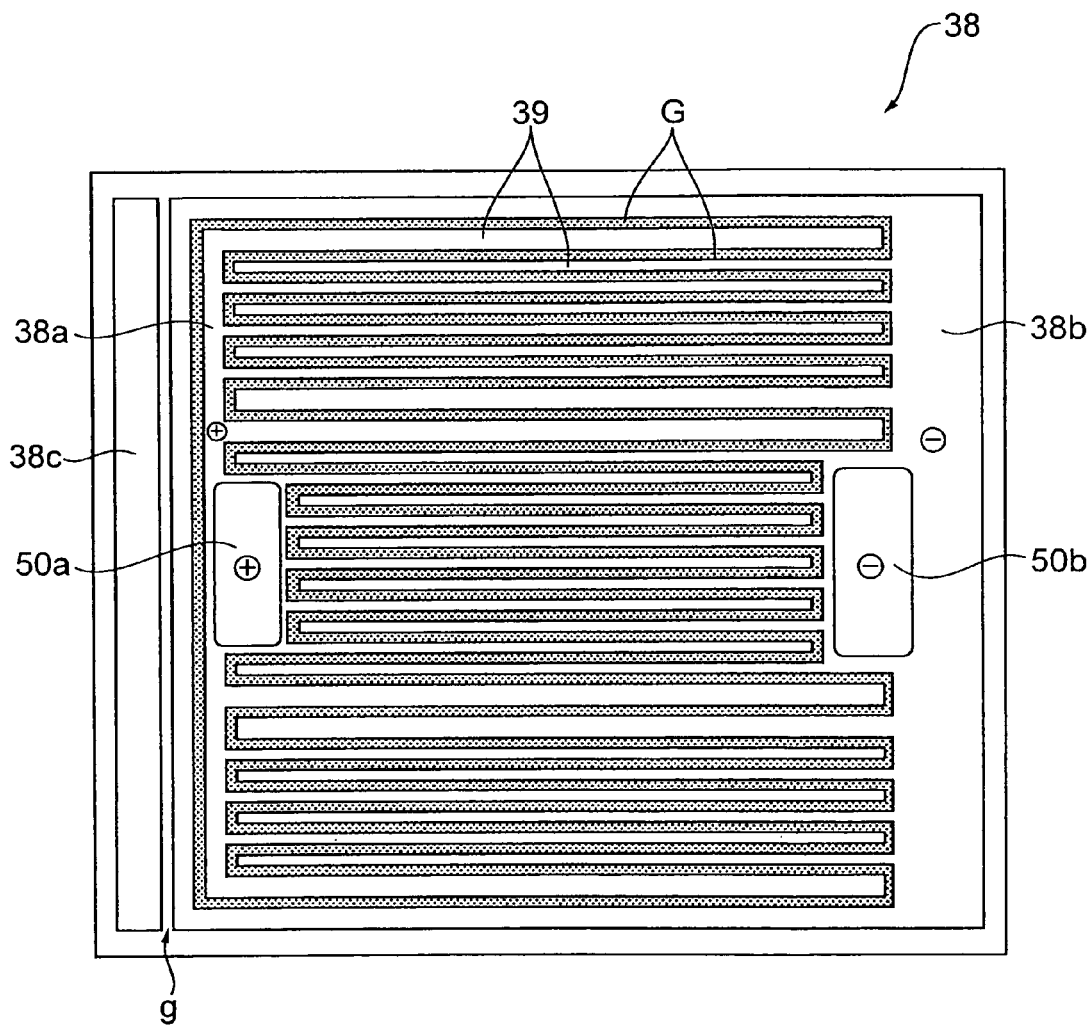
FIG. 20 is a plan view showing the pattern of a second internal electrode of the ceramic capacitor related to the second embodiment.

As described hereinabove, the internal electrodes 38a, 38b, 38c are shape-formed by patterning the plated layer 38 in accordance with the thick-film mask 37, and, consequently, the internal electrode constitutes opposing comb-like shapes that interdigitate as shown in FIG. 20.

Specifically, internal electrode 38a has a plurality of electrode strips 39 of uniform length lined up parallelly in the up-down direction in FIG. 20, and constitutes an interdigitated electrode pattern integrally connected at the respective end parts (the left side end parts in FIG. 20) thereof. Internal electrode 38b also has a plurality of electrode strips 39 of uniform length lined up parallelly in the up-down direction in FIG. 20, and the electrode strips 39 of internal electrode 38a and the electrode strips 39 of internal electrode 38b are lined up in parallel via groove-shaped gap G, which is to be filled up with a ceramic dielectric. The plurality of electrode strips 39 of internal electrode 38b constitutes an interdigitated electrode pattern that is integrally connected at the respective end parts thereof (the right side end parts in FIG. 20), and, in addition, is formed so as to surround internal electrode 38a. Consequently, the periphery of internal electrode 38a is completely surrounded by the above-mentioned gap, and this gap itself forms a closed circuit. Internal electrode 38c is arranged to the left side of internal electrode 38b via a vertically extending groove-shaped gap g, and extends in the up-down direction.

Overall, the internal electrodes 38a, 38b, 38c described hereinabove configure a pair of internal electrodes, in which internal electrode 38a functions as the anode, and internal electrodes 38b functions as the cathode.

Figure 21:
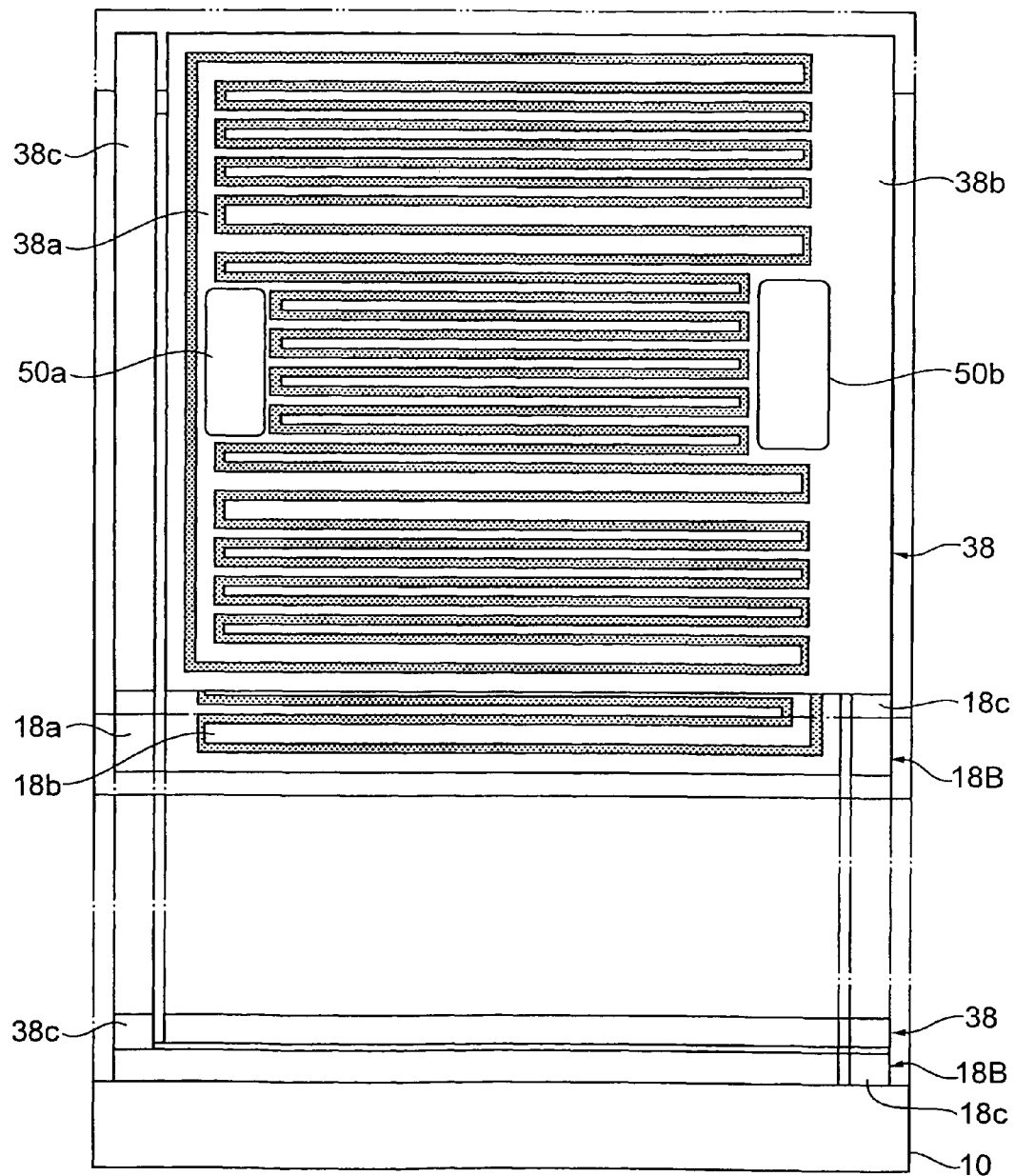
FIG. 21 is a diagram showing a state in which the second internal electrode overlaps the first internal electrode pattern of the ceramic capacitor related to the second embodiment.

The same connection areas 50a, 50b in the areas corresponding to connection areas 50a, 50b of the first-tier of internal electrodes 18a, 18b, 18c are disposed in the internal electrodes 38a, 38b, 38c. Connection area 50a is disposed in internal electrode 38a, and connection area 50b is disposed in internal electrode 38b. Therefore, a plated layer 38 is formed, and as shown in FIG. 21 in a case where the first-tier of internal electrodes 18a, 18b, 18c and the second-tier of internal electrodes 38a, 38b, 38c overlap, the first-tier of internal electrode 18a and the second-tier of internal electrode 38a are electrically connected, and the first-tier internal electrode 18b and the second-tier internal electrode 38b are electrically connected by way of the connection areas 50a, 50b.

The mode may be such that the shape of the above-mentioned electrode strip 39 is the same as the shape of the electrode strip 19 explained in the first embodiment, and branch parts, which parallelly extend from the one electrode strip 39 to the other electrode strip 39, are formed on mutually opposing surfaces of adjacent electrode strips 39.

As shown in FIG. 19, the same as in the first embodiment, a Ni ion beam is also irradiated onto the plated layer 38, and the exposed portions of the seed layer 34 are removed via etching from the gaps G, g included between the internal electrodes 38a, 38b, 38c. This portion of the seed layer 34 is removed in accordance with this ion beam etching, and the internal electrodes 38a, 38b, 38c are electrically insulated from one another at this time. Furthermore, the Ni atoms of the seed layer 34 that are blown off by this ion beam etching reattach to the sidewalls of the electrode strips 39 surrounding this portion of the seed layer 34, thereby increasing the widths of the electrode strips 39 by the size of this reattached part 39a.

Figure 22:
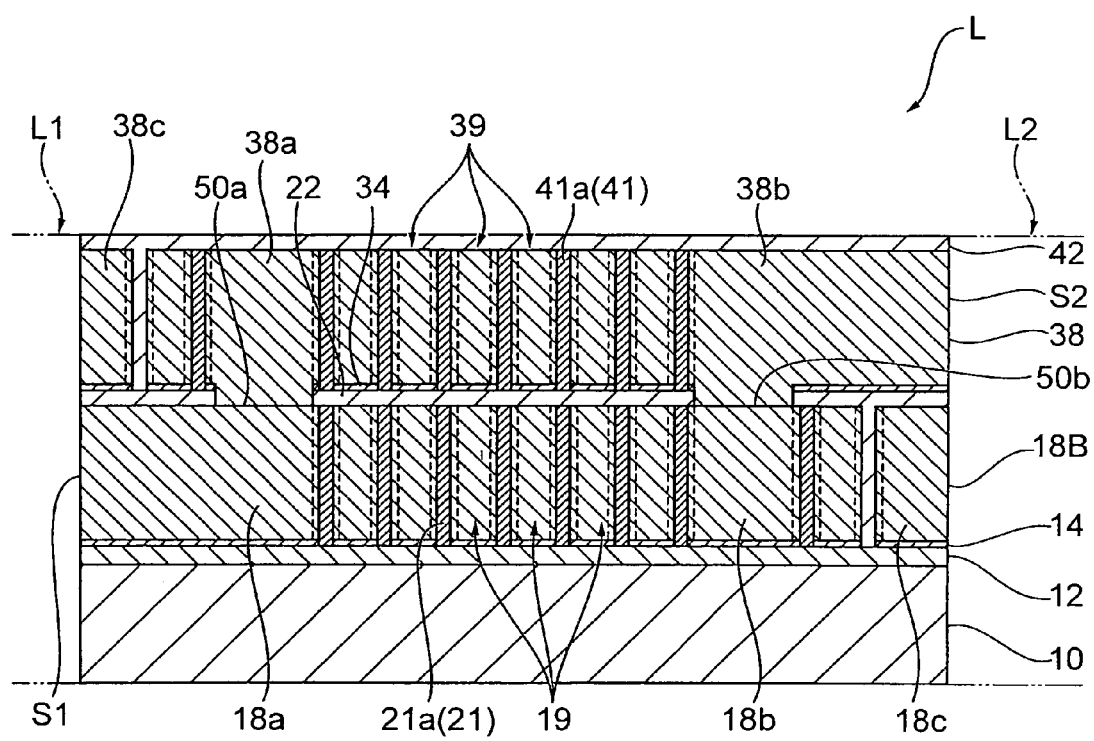
FIG. 22 is a diagram showing one process of the method of manufacturing ceramic capacitor of the second embodiment.

Then, the dielectric slurry application, thermosetting annealing treatment, and insulation layer 42 formation are carried out in accordance with the same steps as in the first embodiment. As a result of this, as shown in FIG. 22, a ceramic dielectric member (a second ceramic dielectric member) 41 comprising dielectric strips 41a formed in the gap G between the electrode strips 39 is formed. In other words, dielectric strips 41a of a ceramic dielectric member 41 are interposed between the adjacent electrode strips 39 of the pair of internal electrodes 38a, 38b, 38c, and the electrode strips 39 and dielectric strips 41a alternately overlap in the surface direction of the substrate 10. Furthermore, since the dielectric slurry does not accumulate in the gap g between internal electrode 38b and internal electrode 38c, this gap g is maintained empty as-is.

Next, as shown in FIG. 22, an $Al_2O_3$ insulation layer 42 having a thickness of between 0.2 and 0.5 μm is formed on the plated layer 38 comprising the internal electrodes 38a, 38b, 38c. The $Al_2O_3$ fills up the gap g between internal electrode 38b and internal electrode 38c at this time.

In actuality, a plurality of stacked members having the same structure as the structure of the stacked member L obtained through the processes explained above is parallelly formed on a single substrate. For this reason, at the time the insulation layer 42 is formed, the stacked member L is linked on both sides to similarly structured stacked members L1, L2 on top of a single substrate 10.

Accordingly, cutting both ends of stacked member L together with the substrate 10 exposes the end faces of the first-tier internal electrodes 18a, 18b, 18c and the end faces of the second-tier internal electrodes 38a, 38b, 38c at the respective end faces (cutting faces) S1, S2 on opposite sides of stacked member L. That is, the end face of internal electrode 18a is exposed at the one end face S1 of the stacked member L, and the end face of internal electrode 38b is exposed at the other end face S2 of the stacked member L.

Finally, as shown in FIG. 13, a pair of external electrodes 24A, 24B are formed so as to connect to the dual pair of internal electrodes 18a, 18b, 18c, 38a, 38b, 38c, completing the manufacture of the ceramic capacitor 1B related to the second embodiment. Of the pair of external electrodes 24A, 24B, external electrode 24A, which function as the anode, are formed by the plating of the end face S1 of the stacked member L, and is electrically connected to the exposed anode 18a, thereby achieving conduction between anodes 18a and 38a. Conversely, external electrode 24B, which functions as the cathode, is formed by the plating of end face S2 of the stacked member L, and is electrically connected to the cathode electrode 38b, thereby achieving conduction between cathodes 18b, 38b.

The ceramic capacitor 1B manufactured in accordance with the above-described manufacturing method realizes the effect of the ceramic capacitor 1A explained in detail in the first embodiment, and, additionally, realizes an increase in capacitance in line with making the internal electrodes a two-tiered configuration.

Furthermore, first-tier internal electrode 18c and second-tier internal electrode 38c of the second embodiment are not connected to electrode strips 19, 39. These internal electrodes 18c, 38c function as raised parts that uniformly maintain the height of the plated layers 18B, 38 over the entire device. That is, in a case where these internal electrodes 18c, 38c are not formed, the planarity of the plated layers 18B, 38 degenerates, causing the precision of the patterning to deteriorate during the manufacturing processes. In particular, preferably the first-tier internal electrode 18c should be formed beforehand to ensure the planarity of the second-tier internal electrodes 38a, 38b, 38c.

The present invention is not limited to the above embodiments, and various changes are possible. For example, the ceramic capacitor described in the second embodiment, in which the ceramic capacitor described in the first embodiment further comprises a structural member that comprises an insulation layer, a second internal electrode and a second ceramic dielectric member, was described, but a mode for a multi-layered ceramic capacitor comprising a plurality of structural members like this is also possible. Consequently, the capacitance of the ceramic capacitor increases yet further due to the increased number of internal electrodes and surface area. At manufacturing time, the step of sequentially forming the insulation layer, the second seed layer and the second thick-film masking layer, the step of forming the second internal electrode, the step of removing the second thick-film mask, and the step of filling the second ceramic dielectric will by repeated a plurality of times.

Further, only a method of manufacturing ceramic capacitor for forming a Ni internal electrode was described, but another plating material, for example, any of Cu, Cr and Ru, may be used instead.

The invention claimed is:

1. A method of manufacturing a ceramic capacitor comprising:
a step of forming a pair of internal electrodes, which are arranged, on a non-conductive substrate, perpendicularly to a surface of the non-conductive substrate, the pair of internal electrodes interdigitate each other via a prescribed gap when viewed in a plan view, and the interdigitated portion of a first internal electrode of the pair of internal electrodes are integrally connected at an end part of the first internal electrode of the pair of internal electrodes when viewed in a plan view and the interdigitated portion of a second internal electrode of the pair of internal electrodes are integrally connected at an end part of the second internal electrode of the pair of internal electrodes when viewed in a plan view, during the step of forming the pair of internal electrodes;
a step of filling a ceramic dielectric member, after forming the pair of internal electrodes, into the prescribed gap between the pair of internal electrodes;
a step of exposing end faces of the first internal electrode and second internal electrode of the pair of internal electrodes; and
a step of forming a pair of external electrodes at the exposed end faces of the first internal electrode and the second internal electrode of the pair of internal electrodes.

2. A method of manufacturing a ceramic capacitor comprising:
a step of forming a pair of internal electrodes, which are arranged, on a non-conductive substrate, perpendicularly to a surface of the non-conductive substrate, and the pair of internal electrodes interdigitate each other via a first prescribed gap when viewed in a plan view and the interdigitated portion of a first internal electrode of the pair of internal electrodes are integrally connected at an end part of the first internal electrode of the pair of internal electrodes when viewed in a plan view and the interdigitated portion of a second internal electrode of the pair of internal electrodes are integrally connected at an end part of the second internal electrode of the pair of internal electrodes when viewed in a plan view, during the step of forming the pair of internal electrodes;

a step of filling a first ceramic dielectric member, after forming the pair of internal electrodes into the first prescribed gap between the pair of internal electrodes;

a step of forming an insulation layer on the pair of internal electrodes, subsequent to the step of filling with the first ceramic dielectric member;

a step of forming, on the insulation layer, another pair of internal electrodes, which are arranged on the non-conductive substrate, perpendicularly to the surface of the non-conductive substrate, and the other pair of internal electrodes interdigitate each other via a second prescribed gap when viewed in a plan view and the interdigitated portion of a first internal electrode of the other pair of internal electrode are integrally connected at an end part of the first internal electrode of the other pair of internal electrodes when viewed in a plan view and the interdigitated portion of a second internal electrode of the other pair of internal electrodes are integrally connected at an end part of the second internal electrode of the other pair of internal electrodes when viewed in a plan view, during the step of forming the other pair of internal electrodes;

a step of filling a second ceramic dielectric member, after forming the other pair of internal electrodes, into the second prescribed gap between the other pair of internal electrodes;

a step of exposing end faces of the first internal electrode and the second internal electrode of the pair of internal electrodes and end faces of the first internal electrode and the second internal electrode of the other pair of internal electrodes; and a step of forming a pair of external electrodes at the exposed end faces of the first internal electrode and the second internal electrode of the pair of internal electrodes and at the exposed end faces of the first internal electrode and the second internal electrode of the other pair of internal electrodes.

3. The method of manufacturing the ceramic capacitor according to claim 2, wherein the step of forming the insulation layer, the step of forming the other pair of internal electrodes, and the step of filling with the second ceramic dielectric member are repeated a plurality of times to achieve multi-layering.

4. The method of manufacturing the ceramic capacitor according to claim 1, wherein, in the step of exposing the end faces of the internal electrodes, the end faces are exposed by cutting portions of the internal electrodes together with the non-conductive substrate.

5. The method of manufacturing the ceramic capacitor according to claim 1, wherein, in the step of filling with the ceramic dielectric member, subsequent to using spin-coating to fill with a ceramic dielectric slurry, the ceramic dielectric slurry is hardened to form the ceramic dielectric member.

6. The method of manufacturing the ceramic capacitor according to claim 5, wherein the ceramic dielectric slurry is a $BaTiO_3$ SOG slurry produced in a sol-gel process.

7. The method of manufacturing the ceramic capacitor according to claim 1, wherein branch parts, which extend from the first internal electrode of the pair of internal electrodes toward the second internal electrode of the pair of internal electrodes to interdigitate each other, are formed on mutually opposing surfaces of the pair of internal electrodes.

\* \* \* \* \*